Patented Jan. 10, 1933

1,893,812

UNITED STATES PATENT OFFICE

JACOB ALBERT WEIL, OF MANCHESTER, ENGLAND, ASSIGNOR TO IMPERIAL CHEMICAL INDUSTRIES LIMITED, OF LONDON, ENGLAND

PRODUCTION OF CATALYTIC MATERIAL

No Drawing. Application filed May 21, 1930, Serial No. 454,513, and in Great Britain June 1, 1929.

This invention relates to the production of catalytic material, and more particularly to an advantageous form of such material for the catalytic oxidation of $SO_2$ on a large scale.

The object of the invention is the production of a catalytic material in such a form that it does not readily change its physical characteristics with use.

Catalytic masses have been proposed comprising vanadium compounds, admixed with silicious material with or without the addition of alkali salts. These masses whilst having adequate activity are of a friable nature and have not had the requisite physical strength for practical use.

It has also been proposed to combine the vanadium compound with the whole or part of the silica to form a complex compound resembling zeolite.

The invention consists in the preparation of a catalytic material by a physical admixture of a vanadium compound with a silicious diluent and a silicious hydrogel.

The invention also consists in the preparation of a catalytic mass of satisfactory activity and adequate physical strength by a simple admixture of a vanadium compound with a silicious material of which a part at least is in the form of a wet hydrogel.

The invention also consists in the process which comprises production of hard pellets or masses consisting of making a mixture of a soluble vanadium compound, a silicious diluent, and a silicious hydrogel, and forming the mixture into pellets or masses by any suitable means, such pellets or masses being treated after drying with burner gas at an elevated temperature.

The invention also consists in the preparation of a catalytic mass in pellet form by mixing a silicious hydrogel with an inert silicious diluent and a vanadium compound, and forming the resultant mass into a pellet preferably heating the pellets with burner gas at an elevated temperature.

The invention also consists in the process which comprises the employment of pellets or masses prepared according to either of the preceding two paragraphs, for the catalytic oxidation of sulphur dioxide to sulphur trioxide.

The invention also consists in processes for the production of catalytic material substantially as described, and in catalytic material which may be made by those processes or by the equivalents thereof.

In carrying the invention into effect, the following examples are given, references to parts being to parts by weight:—

Example 1

A solution of potassium silicate containing about 42 grms. $K_2O$ per litre and having a molecular ratio of $K_2O$ : silica $= 1:3.34$ is prepared.

120 parts finely ground silica are stirred with 310 parts normal sulphuric acid and sufficient of the potassium silicate solution is added to exactly neutralize the acid. Thorough agitation is continued and the mixture gently warmed. After a short time the mixture will set to a white gelatinous mass, which is then allowed to stand 24 hours, by which time a small amount of watery liquid will have separated. This liquid is poured away, and the gelatinous mass mashed up with 20 to 24 parts potassium meta vanadate dissolved in 50 parts water. The thick paste thus produced is then dried at a low temperature on a water bath when it falls to a white powder. This powder is compressed into tablets or pellets which are then dried for 4 hours at 180° C. and afterwards heated in a current of air at a gradually rising temperature up to 400° C. The heating is continued in a stream of burner gas containing 7-8 per cent. $SO_2$, the temperature being gradually raised to 500° C. Catalysis will commence a few minutes after the burner gas is turned on. The resultant bright yellow pellets constitute an excellent catalytic mass for the conversion of $SO_2$ to $SO_3$.

Example 2

60 parts of silica gel prepared by precipitating potassium silicate solution with dilute nitric acid is separated from the supernatant liquor and mixed with 90 parts calcined kieselguhr. A solution of ammonium vanadyl oxalate is prepared by adding oxalic acid to a suspension of 18 parts ammonium vanadate on 200 parts boiling water until a clear deep blue solution results. This solution is evaporated to a bulk of about 50 equvalent volumes and added to the paste of gel and kieselguhr. The whole is now dried on a water bath, and the bright blue powder produced is compressed into pellets which are dried and treated with air and burner gas as described in Example 1. The brownish yellow pellets thus produced are an excellent catalyst for the oxidation of $SO_2$ to $SO_3$.

*General*

The vanadium compound used may be either in the pentavalent or tetravalent form, and is preferably in the form of a soluble salt such as alkali vanadates, alkali vanadites, vanadyl salts or double salts such as vanadyl sulphate, or ammonium vanadyl oxalate.

The silicious material may consist of a finely pulverulent body such as finely ground silica, silicious brick, sand or kieselguhr mixed with wet silica gel.

The pasty mixture of gel and silicious diluent together with the requisite vanadium compound is dried and compressed into pellets. Alternatively the thick pasty mass either with or without partial drying may be extruded through an aperture and the vermiform damp mass dried and broken up. The pellets or lumps are then thoroughly dried and heated to 400° C. or thereabouts in a current of air, and finally treated with burner gas containing $SO_2$ and oxygen at a temperature of from 450° C. to 500° C., when catalytic masses of high activity and suitable physical strength result.

Having now described my invention, what I claim as new and desire to secure by Letters Patent is:—

1. A process for the preparation of a catalytic material, which consists in mixing together a vanadium compound, a silicious diluent and a silica hydrogel substantially in unreacted form.

2. A process for the production of hard substances which consists in mixing together a soluble vanadium compound, a silicious diluent and a silica hydrogel substantially in unreacted form, and forming the mixture into substances of the desired size and shape.

3. A process as claimed in claim 2, in which the substances when substantially dry are treated at an elevated temperature.

4. A process as claimed in claim 2, in which the substances when substantially dry are treated with burner gas substantially in unreacted form.

5. The process which comprises the preparation of a catalytic mass in pellet form by mixing a silica hydrogel substantially in unreacted form with an inert silicious diluent and a vanadium compound, and forming the resultant mass into a pellet, and heating the pellets with burner gas at an elevated temperature.

6. The process which comprises contacting a mixture of sulfur dioxide and air with the catalyst prepared in accordance with claim 2.

7. A catalyst composition comprising silica gel substantially in unreacted form containing a silicious diluent and a vanadium oxide distributed therethrough.

8. A catalyst composition prepared by mixing together a vanadium compound, a silicious diluent and a silica hydrogel substantially in unreacted form, drying the composite mixture and heating at an elevated temperature.

In testimony whereof, I affix my signature.

JACOB A. WEIL.

CERTIFICATE OF CORRECTION.

Patent No. 1,893,812. January 10, 1933.

JACOB ALBERT WEIL.

It is hereby certified that error appears in the printed specification of the above numbered patent requiring correction as follows: Page 2, lines 59 and 60, strike out the words "substantially in unreacted form"; and that the said Letters Patent should be read with this correction therein that the same may conform to the record of the case in the Patent Office.

Signed and sealed this 28th day of February, A. D. 1933.

(Seal)

M. J. Moore,
Acting Commissioner of Patents.